Nov. 6, 1934.    A. E. WIER    1,979,921
PROJECTING APPARATUS
Filed Aug. 30, 1933    2 Sheets-Sheet 1

INVENTOR
Albert E. Wier
BY
ATTORNEYS

Nov. 6, 1934.  A. E. WIER  1,979,921

PROJECTING APPARATUS

Filed Aug. 30, 1933  2 Sheets-Sheet 2

INVENTOR
Albert E. Wier
BY
ATTORNEYS

Patented Nov. 6, 1934

1,979,921

UNITED STATES PATENT OFFICE 1,979,921

PROJECTING APPARATUS

Albert E. Wier, Brooklyn, N. Y.

Application August 30, 1933, Serial No. 687,389

11 Claims. (Cl. 88—28)

This invention relates to apparatus adapted to project upon a screen reproducible matter such as illustrations, reading matter, etc., carried on a roll. The object of the invention is to provide a child's projecting machine that will project the material to be displayed at such a rate that a child can without difficulty absorb the reading matter or illustrations as such reproducible matter is projected upon the screen. A further object of the invention is to provide an inexpensive and compact projecting machine of such simple structure that it may be easily operated by a child. Other more specific objects will appear from the description hereinafter set forth and the features of novelty will be pointed out in the claims.

Figure 1:
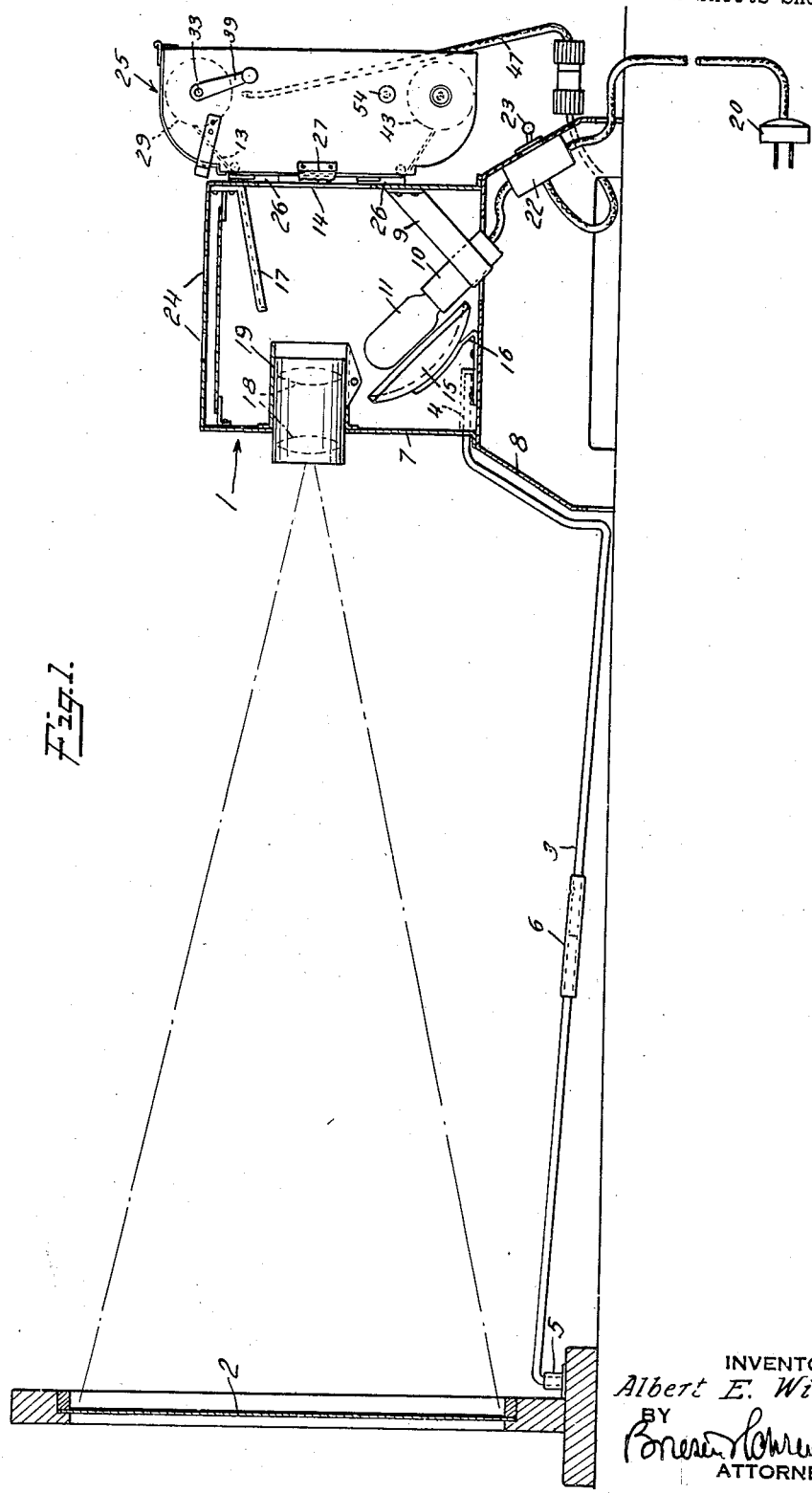
Figure 2:
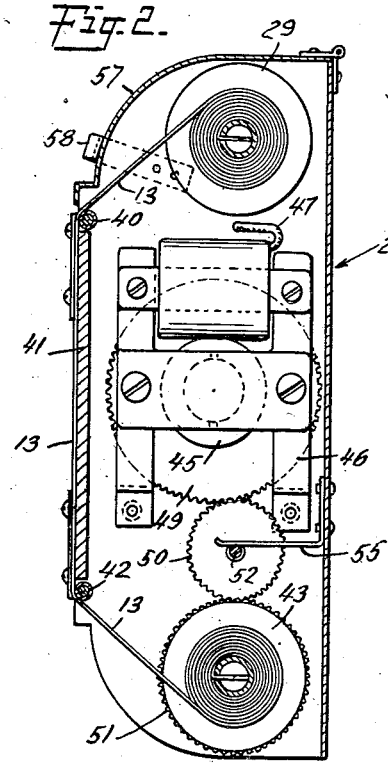
Figure 3:
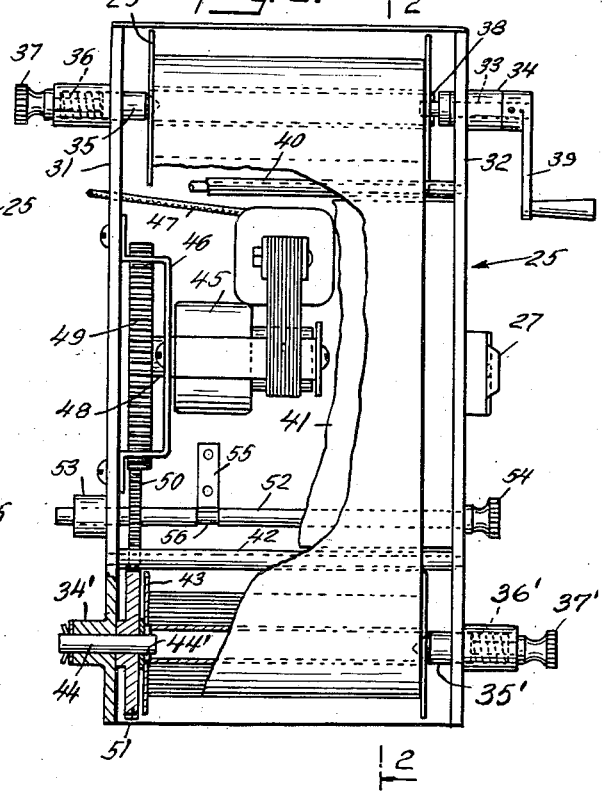
Figure 4:
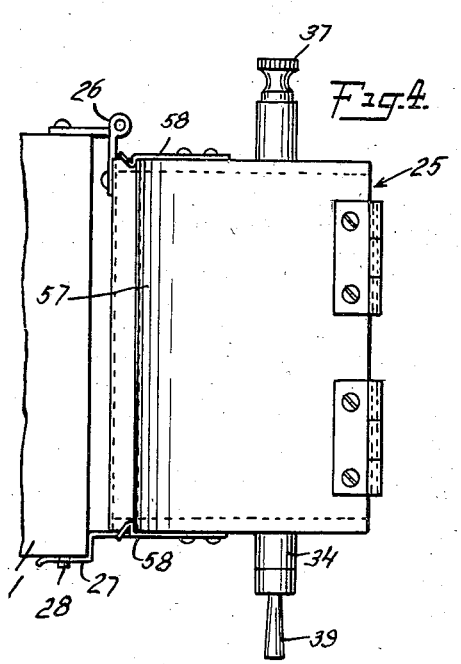

In the accompanying drawings which illustrate the invention without defining its limits, Fig. 1 is a side elevation of the entire apparatus, partly in section to show the arrangement of the projecting mechanism; Fig. 2 is a sectional view taken along line 2—2 of Fig. 3 showing the arrangement of the roll and the feed mechanism; Fig. 3 is a front elevational view of the casing carrying the roll and feed mechanism with the front wall partially broken away to show the feeding mechanism; Fig. 4 is a top view of the casing showing it attached in operative position on the projector housing, and Fig. 5 represents a portion of the roll used in this device showing the arrangement of text and illustrations.

Figure 5:

For the purposes of illustrating the invention, it will be described as specifically employed for the projection of a child's story having reading matter and illustrations alternately disposed on the roll as shown in Fig. 5. However, it is obvious that the roll may consist entirely of reading matter, the device being so constructed and operated that the child can sit at ease and absorb such matter as the enlarged text unfolds itself line after line at a speed coordinated with the child's reading capacity.

Referring to Fig. 1 of the drawings, the device comprises a projecting machine 1 and a screen 2 formed of any desirable material, upon which the reproducible matter is to be projected. Rods 3 are provided in order that the child setting-up the machine for operation may readily place the screen in its correct position with respect to the projector to obtain a clear reproduction. The rods are suitably shaped at one end to engage the sockets 4 mounted on each side of the projection machine and at their other ends to fit into the sockets 5 mounted on the base of the screen 2. In order that the rods may be compactly stored with the projecting machine they are preferably made in two sections as shown in Fig. 1, one section having a socket 6 attached to an end thereof within which the straight end of the other readily fits.

The projecting machine 1 comprises a projector housing 7 open at its lower end and mounted on a base 8 in any suitable manner. Attached to the inner rear wall of the housing 7 is a bracket 9 supporting a lamp socket 10 in such position that the lamp 11 illuminates the face of the roll 13 at its area of exposure through the aperture 14 provided in the rear wall of the housing 7. A reflector 15, suitably supported by a bracket 16, is mounted on the base 8 of the projector in such position that it concentrates the light beams from the lamp 11 on the exposed face of the strip to be projected. A mirror 17 is also provided on the inner rear wall of the housing above the aperture 14 to reflect the light beams from the lamp on the exposed face of the strip. The lenses 18 which project the images from such strip onto the screen 2 are mounted in proper position in a cylindrical casing 19 which is suitably supported in an aperture in the front wall of the housing directly opposite the aperture 14. Current for the lamp 11 is obtained by connecting the plug 20 to a house outlet and its operation is controlled by the switch 23. Apertures 24 are provided in the housing 7 to allow air to circulate in the housing and carry off the heat generated by the lamp 11.

The roll 13 bearing the reproducible matter is carried in a casing 25 pivotally supported by hinges 26 on the housing 7 so that it may be swung clear of the latter to permit removal of a used roll or insertion of a new one, as will be hereinafter explained. During the operation of the machine, however, the casing 25 is in the position shown in Fig. 1 and is held in such position by a spring catch 27 which engages a projection 28 on the housing, as shown in Fig. 4. The reel 29 upon which the roll 13 is mounted is supported in the upper portion of the casing 25 by the inner end of a shaft 33 rotatably mounted in a bearing 34 and by a pin 35 which normally projects into the casing to its fullest extent under the tension of a spring 36. The pin 35 may be withdrawn sufficiently to allow the insertion or removal of a roll by pulling outwardly on the hand nut 37 against the tension of spring 36. The inner end of the shaft 33 is provided with oppositely disposed lugs 38 adapted to engage with a slot provided in one end of the reel 29, whereby the reel is coupled to the shaft, and is provided at its outer end with a hand crank 39 so that the roll 13 may be rewound on the reel 29 after the projection of the matter contained on the roll has been completed. The roll 13 unwinds in a counterclockwise direction, viewed from Fig. 2, and passes around a guide pulley 40, over a plate 41, around the guide pulley 42 and is attached at its other end in any suitable manner to the wind up reel 43. The plate 41 which is supported by the sides 31, 32 of the casing 25, is closely adjacent to the outer rear wall of the projector housing when the casing 25 is in the operating position, as shown in Fig. 1, so that as the strip to be projected passes over such plate its face will be illuminated by the beams from the light source 11 through the aperture 14. The reel 43 is supported in the lower portion of the casing 25 by the inner end of a shaft 44 rotatably mounted in a bearing 34', and by a pin 35' which projects into the casing under the tension of a spring 36' in a manner similar to that of pin 35. Ordinarily there is no need to remove the reel 43 from the casing as the roll 13 is re-wound on the reel 29 after the projection thereof has been completed but it may be removed therefrom by pulling outwardly on the hand nut 37' against the tension of spring 36', thus withdrawing the pin 35' sufficiently to free the reel.

The feeding mechanism for the roll 13 comprises a motor 45 supported on the side wall 31 of the casing by means of a bracket 46. The motor 45, which is of the type commonly used in electric clocks, is run on 60 cycle alternating current and makes one complete revolution every minute. Current is brought to the motor by a lead 47 connected at its other end to the switch box 22 in such a manner that the switch 23 when thrown into operative position to light the lamp 11 simultaneously starts the motor 45. Fixedly attached to the outer end of the motor shaft 48 is a gear 49 which is connected by means of an idler gear 50 to a gear 51 mounted adjacent to the inner end of shaft 44. The inner end of this shaft is provided with oppositely disposed lugs 44' which are adapted to engage a slot in the end of the wind-up reel 43 so that when shaft 44 is caused to rotate in a counter-clockwise direction, looking at Fig. 2, by the motor 45 through the chain of gears 49, 50 and 51, the wind-up reel also rotates in the same direction. Movement of the wind-up reel 43 in this direction unwinds the roll 13 from its reel 29, moving it downwardly past the aperture 14 so that the reproducible matter on the face thereof will be projected on the screen in a slowly advancing sequence. The gears 49 and 51 are preferably of such size that the reproducible matter moves in a vertical direction on the screen at such a speed that a child can readily absorb such matter. In the present instance gear 49 is provided with 120 teeth and gear 51 with 84 teeth so that as the gear 49 is being rotated at the rate of one revolution per minute by the motor 45, gear 51 will rotate at the rate of one and three-sevenths revolutions per minute. At this speed of rotation of the gear 51, the illustrations on the roll 13 will move across the screen at a rate sufficiently slow to allow the child opportunity to grasp the meaning of such illustrations while not affecting the continuity of the story and the reading matter on the roll, the reading matter moving over the screen at a speed of approximately one hundred words per minute, which speed of feed a young child can follow comfortably.

The idler gear 50 is mounted on a shaft 52 supported in the casing at one end by the bearing 53 and at its other end by the side wall 32 of the casing 25. The shaft 52 is mounted for axial movement in such supports and is provided at one end with a hand nut 54 so that the operator, by pulling outwardly on such hand nut, may shift the position of the shaft 52 to the right, looking at Fig. 3, thus disengaging the idler gear 50 from the gear 51 and disconnecting the latter, and consequently the reel 43, from the motor 45. The roll 13 may then be re-wound on its reel 29 by turning the crank handle 39 in a clockwise direction, as viewed in Fig. 2. Gear 49, however, is of such width that, whatever position gear 50 is in, it will never be disconnected from the latter.

A spring detent 55 supported by the rear wall of the casing is adapted to engage a channel 56 formed in the shaft 52 when the idler gear 50 is meshed with gears 49 and 51 to prevent the idler gear from being disconnected from these gears during the operation of the machine.

In preparing the device for operation the screen is first set up in front of the projector housing and established in its correct position with respect to the latter by inserting the ends of the rods 3 in their proper sockets 4, 5. With the switch 23 in its inoperative position, the plug 20 is inserted into a house outlet. The roll to be projected is then inserted in its proper place in the casing 25. To accomplish this the casing is first swung back on its hinges so that it is clear of the projector housing 7 and the cover 57 is lifted about its hinges. The hand nut 37 is then pulled outwardly against the tension of spring 36 to withdraw the pin 35 a sufficient distance from the casing, and the reel 29 bearing the roll 13 is slipped over the end of the shaft 33 in such manner that the slotted end of the reel 29 engages with the lugs 38 mounted on such shaft. The pin 35 is then released so that it engages with the opening in the end of the reel adjacent thereto. The free end of the roll 13 is then threaded over the guide pulley 40, the plate 41 and guide pulley 42 and attached in any suitable manner to the wind-up reel 43. The casing cover 57 is swung down to closed position and is held in such position by the spring catches 58 mounted on the side walls 31, 32 of the casing. Pressure clips may be provided on the cover 57 in such manner that they bear on the face of the strip to be projected when the cover is in closed position to hold the strip against the face of the plate 41 during the projection of the roll. The shaft 52 being in the position shown in Fig. 3, so that gear 50 connects gears 49 and 51, the casing 25 is then swung back into the position shown in Fig. 1 so that the face of the strip to be projected lies closely adjacent to the aperture 14. The switch 23 is then turned on to illuminate the lamp 11 and provide current for the motor 45, which then rotates the wind-up reel 43 in a counter-clockwise direction, looking at Fig. 2, through the medium of gears 49, 50 and 51 and shaft 44 to which the reel 43 is positively connected by the lugs 44' which engage in the slot in its end. The rotating reel 43 unwinds the roll 13 from its reel 29 moving the strip to be projected past the aperture 14 in the projector housing 7. As the strip moves past such aperture the lamp 11 illuminates the face thereof on which are carried the illustrations and reading matter, the images from the strip being projected by the lens assembly onto the screen. As stated hereinbefore, the speed of rotation of the motor and the diameter of gears 49, 50 are such that the strip to be projected is caused to move past the aperture at a speed that is commensurate with a child's ability to absorb the matter projected on the screen. The reproducible matter on the roll is preferably arranged in the manner shown in Fig. 5 that is, the text and illustrations are alternately disposed on the roll in such manner that a portion of the text of the story is first thrown on the screen, after which follows an appropriate illustration for such text, so that the child obtains a visual impression of the story in the manner followed by children's story books. This arrangement also makes it possible for young children, whose ability to read is not very great, to obtain amusement looking at the illustrations alone while the text may be read to them by the older children. When the showing of the illustrated matter on the roll has been completed, the switch 23 is turned off, thus simultaneously stopping the feed of the roll and putting out the lamp 11. The wind-up reel 43 is then disconnected from the motor 45 by pulling outwardly on the hand nut 54 disengaging the idler gear 50 from the gear 51. The roll may then be re-wound upon its reel 29 by turning the crank 39 in a clockwise direction to prepare it for its next showing or preparatory to removing it from the casing so that a new roll may be inserted.

I claim:

1. An apparatus for projecting reading matter, illustrations, or the like comprising, in combination, a projector housing having an aperature in one wall thereof, a casing supported on said housing closely adjacent to said aperture, means in said casing for supporting a roll having reproducible matter thereon, means for continuously feeding said reproducible matter past said aperture, a portable screen, a support therefor, mechanism in said projector housing for projecting on said screen the reproducible matter exposed through said aperture, and means for detachably positioning the screen with respect to the projector housing at a definite predetermined distance therefrom, said means comprising separable sections, an anchorage on the projector housing for one of said sections, an anchorage on the screen support for another section, and anchoring means between the several sections intermediate of the anchored ends thereof.

2. An apparatus for projecting reading matter, illustrations, or the like comprising, in combination, a projector housing having an aperture in one wall thereof, a casing separate from said housing, means pivotally supporting said casing on said housing closely adjacent to said aperture, a reel adapted to support thereon a roll carrying reproducible matter, means for supporting said reel in said casing, a wind-up reel for said roll mounted in said casing, means in said casing for continuously feeding said reproducible matter past said aperture, said means comprising a motor operatively connected to said wind-up reel, mechanism in said projector housing for projecting on a screen the reproducible matter exposed through said aperture, means for disconnecting said wind-up reel from said motor when the projection of said roll has been completed thereby enabling said wind-up reel to rotate freely in either direction, and means independent of said motor for rewinding said roll upon its reel.

3. An apparatus for projecting reading matter, illustrations, or the like, comprising, in combination, a projector housing having an aperture in one wall thereof, a casing pivotally supported on said housing, the front wall of said casing being positioned closely adjacent to said aperture, a reel adapted to support thereon a roll carrying reproducible matter, means for supporting said reel in the upper portion of said casing, a portion of said roll of reproducible matter extending between the front wall of said casing and the apertured wall of said projector housing, a wind-up reel for said roll mounted in the lower portion of said casing, means for feeding said roll past said aperture in a slowly advancing sequence, said means comprising a motor supported in said casing, a gear mounted on the shaft of said motor, a gear operatively connected with said wind-up reel and an idler gear connecting said motor gear and said wind-up gear, a shaft supporting said idler gear and adapted to be moved axially to disconnect said motor gear from said wind-up gear, and means for rewinding said roll upon its reel when said wind-up reel is disconnected from said motor.

4. An apparatus for projecting reading matter, illustrations, or the like, comprising a projector housing having an aperture in one wall thereof, mechanism in said projector housing for projecting on a screen the reproducible matter exposed through said aperture, a casing supported on said housing, means in the casing adapted, in the projecting position of the parts, to lie closely adjacent to such aperture to maintain the matter to be projected in registry with said aperture, releasable means for retaining the casing in rigid association with the housing during projection and for permitting movement of the casing away from the housing during a non-projecting interval to allow ready replacement or removal of matter which has been projected, a reel, a roll bearing reproducible matter mounted on said reel, means for rotatably supporting said reel in the casing, a take-up reel for the material drawn from said roll mounted in the casing, means for causing the unwound portions of said roll to pass slowly but continuously between the apertured wall of the projector housing and the casing adjacent thereto, said means being arranged to rotate the wind up reel continuously and at a predetermined and constant speed and thereby to continuously feed the reproducible matter on the roll past the aperture of the projector housing at a predetermined rate of speed, said means comprising a motor supported in said casing and a train of gears between said motor and the take-up reel.

5. An apparatus for projecting reading matter, illustrations, or the like, comprising a projector housing having an aperture in one wall thereof, a casing supported on said housing and so movable relatively thereto that one side of the casing lies closely adjacent to the aperture of the housing when the parts are in the projecting position, a reel having mounted thereon a roll bearing reproducible matter, means for supporting said reel in said casing, a wind-up reel for said roll mounted in the casing, means for guiding the unwinding portion of said roll between the apertured wall of the projector housing and the side of the casing adjacent thereto, means for continuously and at a predetermined and constant speed rotating the wind-up reel and thereby continuously feeding the reproducible matter on said roll past and between the casing and the field represented by the aperture in the projector housing, said means comprising a motor supported in the casing and mechanism in the projector housing for projecting on a screen the reproducible matter exposed through said aperture.

6. An apparatus for projecting reading matter, illustrations, or the like, comprising a projector housing having an aperture in one wall thereof, a casing supported on said housing, means for the casing adapted in the projecting position of the parts to lie closely adjacent to said aperture for maintaining the matter to be projected in registry with said aperture, a reel having mounted thereon a roll bearing reproducible matter, means for supporting said reel in said casing, a wind-up reel for said roll mounted in the casing, means for causing the unwinding portion of said roll to pass continuously between the apertured wall of the projector housing and the parts of the casing adjacent thereto, said means being arranged to continuously feed the reproducible matter on the roll past the aperture in the housing at a predetermined speed and comprising a motor supported in said casing, means operatively connecting said motor with said wind-up reel and mechanism in said housing for projecting on a screen the reproducible matter exposed through said aperture.

7. Projecting apparatus such as set forth in claim 4 in which the train of gears between the motor and the take-up reel is arranged to cause the wind-up reel to rotate more rapidly than the motor.

8. Projecting apparatus such as set forth in claim 4 in which the motor and the train of gears between the motor and the take-up reel are arranged to limit the speed of rotation of the take-up reel to one which approximates a speed obtainable by the use of a motor rotating a gear of 120 teeth at the rate of one revolution per minute, driving a gear of about 84 teeth on the take-up reel.

9. An apparatus for projecting reading matter, illustrations, or the like, comprising a projector housing having an aperture in one wall thereof, a casing separate from said housing, means pivotally supporting said casing on said housing so that one wall thereof lies closely adjacent to said aperture, a reel having mounted thereon a roll bearing reproducible matter, means for supporting said reel in said casing, a wind-up reel for said roll mounted in said casing, means for guiding the unwound portion of said roll between the apertured wall of said projector housing and the wall of said casing adjacent thereto, means for continuously feeding the reproducible matter on said reel past the aperture in said projector housing in a slowly advancing sequence, said means comprising a motor supported in said casing, speed changing mechanism connecting said motor with said wind-up reel to move the latter at a rate approximating the speed obtainable by the use of a motor rotating a gear of 120 teeth at the rate of one revolution per minute, driving a gear of about 84 teeth on the wind-up reel, mechanism in said projector housing for projecting the reproducible matter exposed through said aperture, and means for simultaneously controlling the operation of said feeding means and said projecting means.

10. An apparatus for projecting reading matter, illustrations, or the like, comprising a projector housing having an aperture in one wall thereof, a casing separate from said housing, means pivotally supporting said casing on said housing so that one wall thereof lies closely adjacent to said aperture, a reel having mounted thereon a roll bearing reproducible matter, means for supporting said reel in said casing, a wind-up reel for said roll mounted in said casing, means for guiding the unwound portion of said roll between the apertured wall of said projector housing and the wall of said casing adjacent thereto, means for continuously feeding the reproducible matter on said roll past the aperture in said projector housing in a slowly advancing sequence, said means comprising a motor supported in said casing, speed-changing mechanism connecting said motor with said wind-up reel to move the latter at a rate approximating the speed obtainable by the use of a motor rotating a gear of 120 teeth at the rate of one revolution per minute, driving a gear of about 84 teeth on the wind-up reel, mechanism in said projector housing for projecting on a screen the reproducible matter exposed through said aperture, means for disconnecting said wind-up reel from said motor when the projection of said roll has been completed, thereby enabling said wind-up reel to rotate freely in either direction, and means independent of said motor for rewinding said roll upon its reel at a greater speed than it is unwound during the projection of the reproducible matter.

11. An apparatus for projecting reading matter, illustrations, or the like, comprising a projector housing having an aperture in one wall thereof, a casing separate from said housing, means supporting said casing on said housing so that one wall thereof lies closely adjacent to said aperture, a reel having mounted thereon a roll bearing reproducible matter, means for supporting said reel in said casing, a wind-up reel for said roll mounted in said casing, means for guiding the unwound portion of said roll between the apertured wall of said projector housing and the wall of said casing adjacent thereto, means in said casing for continuously feeding the reproducible matter on said roll past the aperture in said projector housing, said means comprising a motor, a gear mounted on the shaft of said motor, a gear operatively connected with said wind-up reel and an idler gear connecting said motor gear with said wind-up gear, a shaft supporting said idler gear and adapted to move axially to disconnect said wind-up reel from said motor, means for maintaining said idler gear in connected position during the projection of said reproducible matter and means for rewinding said roll upon its reel when said wind-up reel is disconnected from said motor.

ALBERT E. WIER.